United States Patent
Wang et al.

(10) Patent No.: US 9,049,373 B2
(45) Date of Patent: Jun. 2, 2015

(54) IMAGE CAPTURING APPARATUS AND METHOD FOR CAPTURING IMAGES OF OBJECTS

(75) Inventors: Guang-Jian Wang, Shenzhen (CN); Yan Li, Shenzhen (CN); Xiao-Mei Liu, Shenzhen (CN); Meng-Zhou Liu, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 444 days.

(21) Appl. No.: 13/539,489

(22) Filed: Jul. 1, 2012

(65) Prior Publication Data

US 2013/0050428 A1 Feb. 28, 2013

(30) Foreign Application Priority Data

Aug. 30, 2011 (CN) .......................... 2011 1 0252528

(51) Int. Cl.
*H04N 13/02* (2006.01)
*H04N 5/232* (2006.01)
*H04N 13/00* (2006.01)

(52) U.S. Cl.
CPC ....... *H04N 5/23248* (2013.01); *H04N 13/0055* (2013.01); *H04N 13/0239* (2013.01)

(58) Field of Classification Search
CPC .......... H04N 5/23248; H04N 13/0055; H04N 13/0239
See application file for complete search history.

(56) References Cited

U.S. PATENT DOCUMENTS

| | | | | |
|---|---|---|---|---|
| 6,094,215 | A * | 7/2000 | Sundahl et al. | 348/42 |
| 6,304,284 | B1 * | 10/2001 | Dunton et al. | 348/36 |
| 2007/0298881 | A1 * | 12/2007 | Kawamura et al. | 463/33 |
| 2010/0080419 | A1 * | 4/2010 | Okugi et al. | 382/104 |
| 2010/0141799 | A1 * | 6/2010 | Yamashita et al. | 348/239 |

* cited by examiner

*Primary Examiner* — Joseph Ustaris
*Assistant Examiner* — Zhubing Ren
(74) *Attorney, Agent, or Firm* — Novak Druce Connolly Bove + Quigg LLP

(57) ABSTRACT

A method captures images of objects using an image capturing apparatus. The method obtains x-coordinate values, y-coordinate values, and z-coordinate values of the accelerations of a camera device sensed by a gravity sensor in a default time interval, calculates three-dimensional coordinate differences according to the obtained x-coordinate, y-coordinate, and z-coordinate values, and determines whether the three-dimensional coordinate differences are less than corresponding predefined thresholds. If at least one coordinate difference is not less than a corresponding predefined threshold, the method delays a period of time to obtain the x-coordinate, y-coordinate, and the z-coordinate values in a next default time interval. If all the three-dimensional coordinate differences are less than the corresponding predefined thresholds, the method controls the camera device to capture images of the subject object.

18 Claims, 3 Drawing Sheets

IMAGE CAPTURING APPARATUS AND METHOD FOR CAPTURING IMAGES OF OBJECTS

BACKGROUND

1. Technical Field

Embodiments of the present disclosure relate to image capturing systems and methods, and particularly to an image capturing apparatus, a storage medium, and a method for capturing images of objects.

2. Description of Related Art

In order to shoot clear close-up images of objects such as products (e.g., motherboards) or work pieces in a factory setting, image stabilization technology should be applied to overcome vibrations, such as using image stabilization devices. However, this solution is costly.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean "at least one."

In the present disclosure, the word "module," as used herein, refers to logic embodied in hardware or firmware, or to a collection of software instructions, written in a program language. In one embodiment, the program language may be Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of a non-transitory computer-readable medium include CDs, DVDs, flash memory, and hard disk drives.

Figure 1:
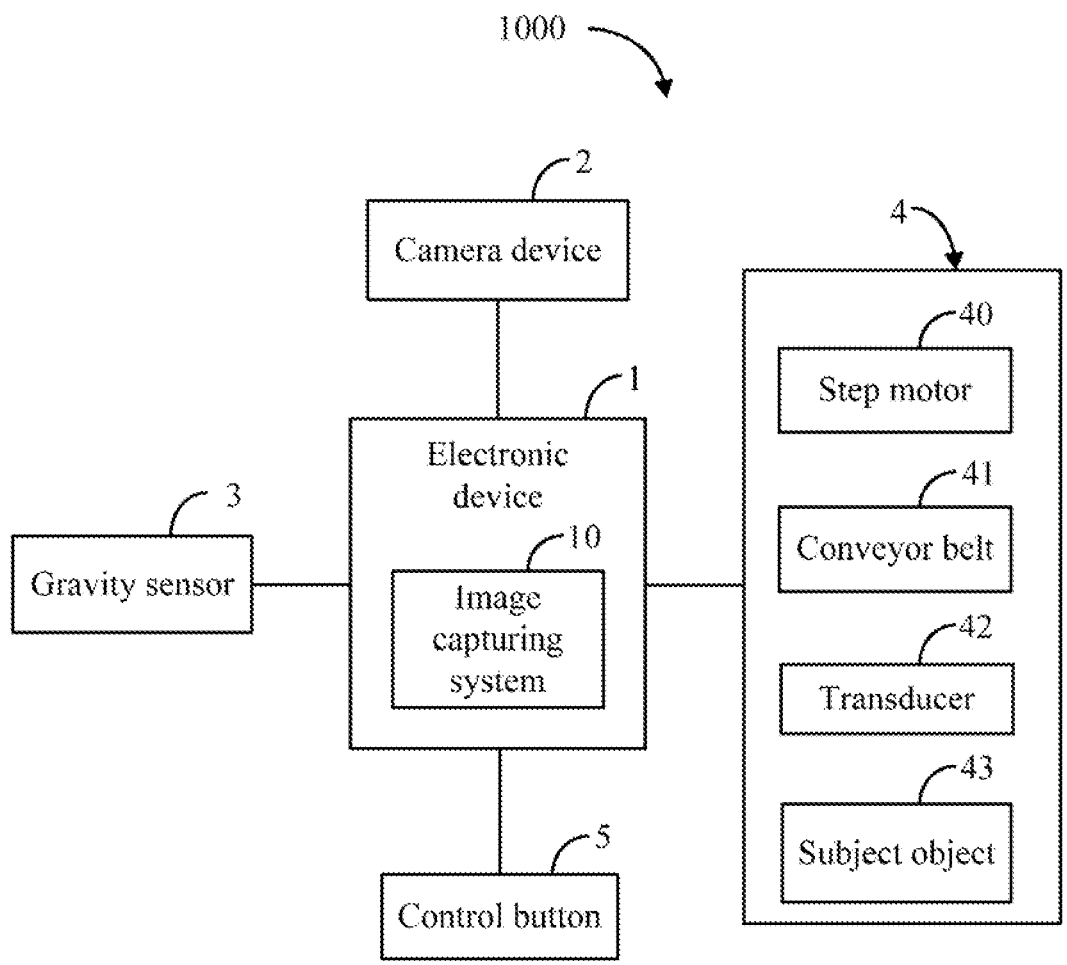
FIG. 1 is a block diagram of one embodiment of an image capturing apparatus.

FIG. 1 is a block diagram of one embodiment of an image capturing apparatus 1000. In the embodiment, the image capturing apparatus 1000 includes an electronic device 1, a camera device 2, a gravity sensor 3, a work platform 4, and a control button 5. The electronic device 1 may be a computer, a server, or any other computing device. The electronic device 1 includes an image capturing system 10. The work platform 4 includes a step motor 40, a conveyor belt 41, and a transducer 42. A subject object 43 is placed on the conveyor belt 41 of the work platform 4. FIG. 1 is one example of the image capturing apparatus 1000, other examples may include more or fewer components than those described in the embodiment, and may have a different configuration of the various components.

It should be understood that in a factory setting, vibrations are not constant but rise and fall cyclically according to machine use etc. Because the camera device 2 is fixed to the image capturing apparatus 1000 to capture images of the subject objects 43 as they pass by on the conveyor belt 41, vibrations may be regularly too great to take clear pictures without special image stabilization devices. However, with the present image capturing system 10, once the conveyor belt 41 with the subject object 43 brings the subject object 43 into view of the camera device 2 and stops, vibration detection occurs and image capture is done only when vibrations have settled to an acceptable level (a predetermined level or user-determined level) so that images may be captured without the special image stabilization devices built into the camera device 2.

The camera device 2 may be a digital camera that is used to capture images of the subject object 43. The electronic device 1 is connected to the camera device 2 and the gravity sensor 3 by at least one bus. The bus may be an Universal Serial Bus (USB) type, for example, USB/1394. The gravity sensor 3 is configured to sense vibration of the camera device 2. In one embodiment, the camera device 2 and the gravity sensor 3 are fixed in the same framework of the image capturing apparatus 1000, and are located in the same vertical surface of the framework to ensure that the sensing vibration of the gravity sensor 3 and the true enduring vibration of the camera device 2 are about the same.

The gravity sensor 3 senses the changes of accelerations of the camera device 2. The gravity sensor 3 analyzes the changes of accelerations into three-dimensional coordinate values in a space coordinate system, and stores the three-dimensional coordinate values to a register of the gravity sensor 3. The three-dimensional coordinate values are x-coordinate values, y-coordinate values, and z-coordinate values of the space coordinate system. In one embodiment, the gravity sensor 3 may obtain 400-1000 x-coordinate values, y-coordinate values, and z-coordinate values per second.

The step motor 40, the transducer 42, and the control button 5 electronically connect to the electronic device 1 through serial ports, in one example. In one embodiment, if the electronic device 1 detects the control button 5 is pressed, the electronic device 1 sends a control command to the step motor 40, and the step motor 40 controls the conveyor belt 41 to move. The transducer 42 is used to detect the position of the subject object 43 as it moves with the conveyor belt 41.

Figure 2:
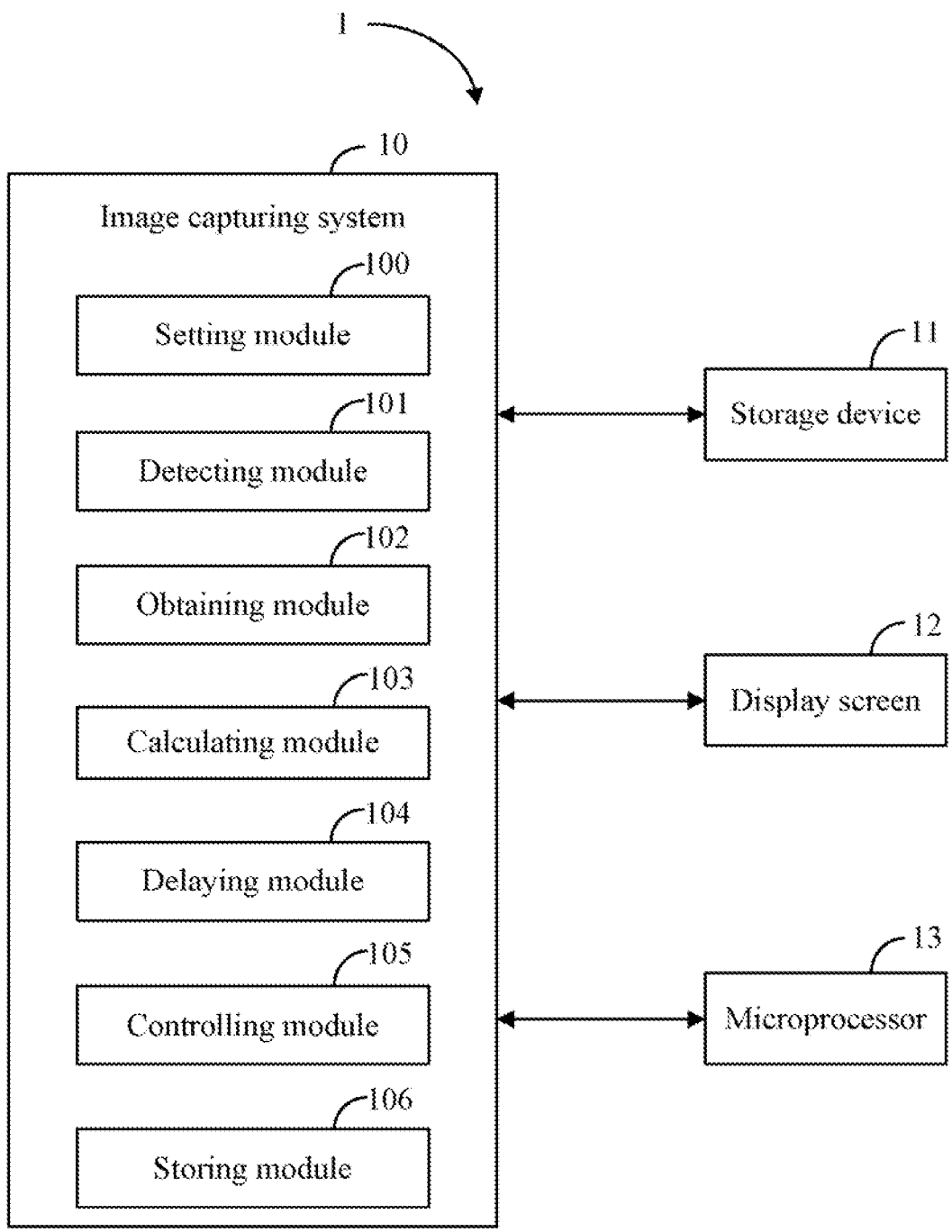
FIG. 2 is a block diagram of one embodiment of an electronic device including an image capturing system.

FIG. 2 is a block diagram of one embodiment of the electronic device 1 including an image capturing system 10. In one embodiment, the electronic device 1 further includes a storage device 11, a display screen 12, and a microprocessor 13. The image capturing system 10 may include a plurality of functional modules that are stored in the storage device 11 and executed by the at least one microprocessor 13. The display screen 12 displays images of the subject object 43. The storage device 11 stores the images of the subject object 43 and the three-dimensional coordinate values of the gravity sensor 3. In one embodiment, the storage device 11 may be an internal storage device, such as a random access memory (RAM) for temporary storage of information, and/or a read only memory (ROM) for permanent storage of information. In some embodiments, the storage device 11 may also be an external storage device, such as an external hard disk, a storage card, or a data storage medium.

In one embodiment, the image capturing system 10 includes a setting module 100, a detecting module 101, an obtaining module 102, a calculating module 103, a delaying module 104, a controlling module 105, and a storing module 106. The modules 100-106 may comprise computerized instructions in the form of one or more programs that are stored in the storage device 11 and executed by the at least one microprocessor 13. Detailed descriptions of each module will be given in FIG. 3 as described in the following paragraphs.

Figure 3:
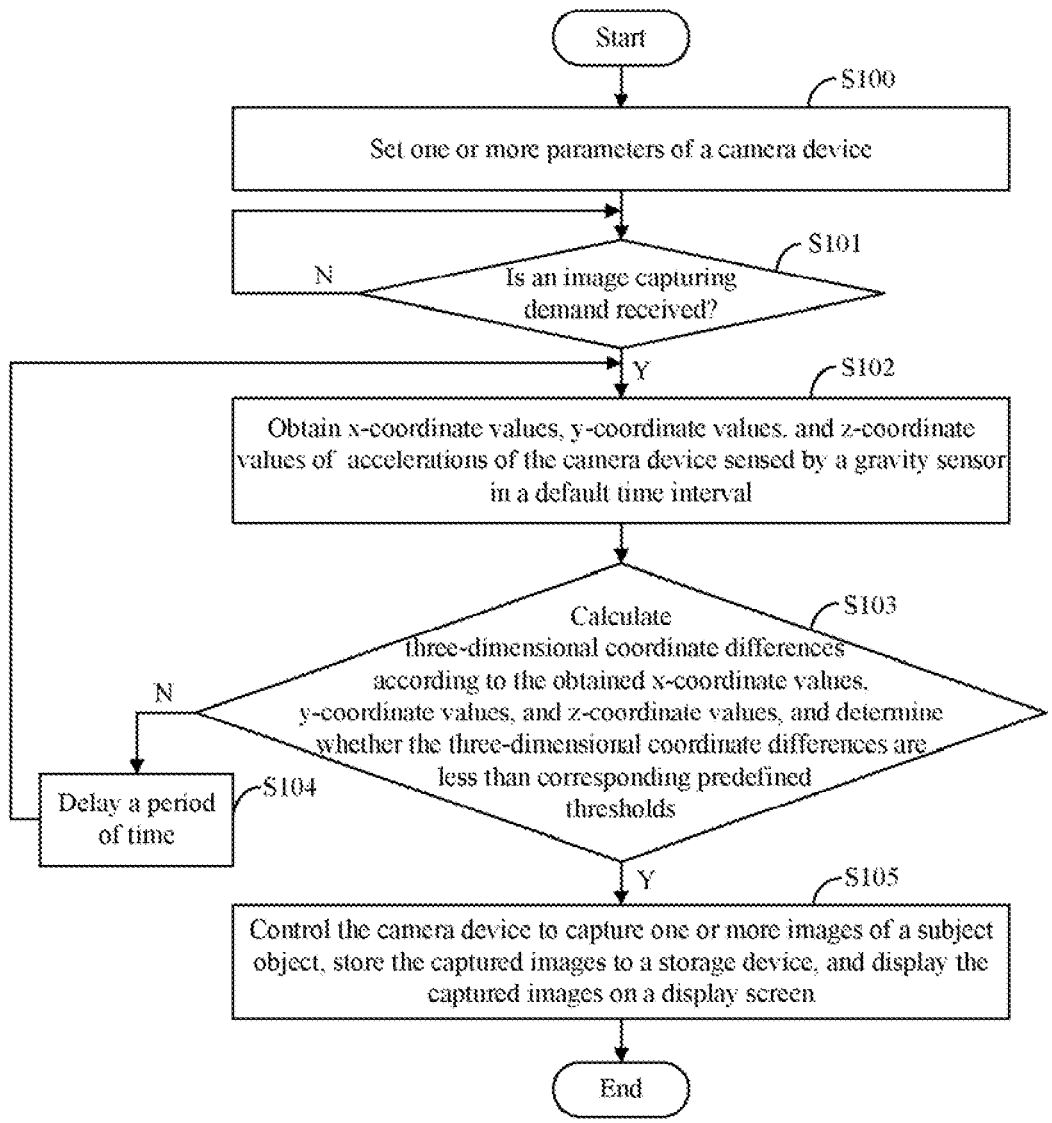
FIG. 3 is a flowchart of one embodiment of a method for capturing images of objects using the image capturing apparatus of FIG. 1.

FIG. 3 is a flowchart of one embodiment of a method for capturing images of an object using the image capturing apparatus 1000 of FIG. 1. Depending on the embodiment, additional steps may be added, others removed, and the ordering of the steps may be changed.

In step S100, the camera device 2 is turned on and the setting module 100 sets one or more parameters of the camera device 2. The parameters of the camera device 2 includes an aperture setting, an exposure time, an image size, and synchronization of a flash light of the camera device 2.

In step S101, the detecting module 101 detects whether an image capturing demand is received. If an image capturing demand is received, step S102 is implemented. If no image capturing demand is received, step S101 is repeated. In one embodiment, the detecting module 101 detects whether an image capturing demand is received by determining whether the subject object 43 entirely enters into a field of view of the camera device 2.

When the control button 5 of the image capturing apparatus 1000 is pressed by a user, the detecting module 101 sends a control command to the step motor 40, and the step motor 40 controls the conveyor belt 41 to move. The transducer 42 monitors the field of view of the camera device 2 and detects when the subject object 43 enters entirely into the field of view of the camera device 2. When the transducer 42 detects the subject object 43 entirely enters into the field of view of the camera device 2, the detecting module 101 determines that an image capturing demand is received, and the detecting module 101 sends the control command to the step motor 40 to stop the conveyor belt 41.

In step S102, after the conveyor belt 41 stops moving, the obtaining module 102 obtains the accelerations of the camera device 2 using the gravity sensor 3, and obtains x-coordinate values, y-coordinate values, and z-coordinate values of the accelerations of the camera device 2 in a default time interval. In the embodiment, the time interval is set according to the exposure time of the camera device 2 used, begins with current time, and finishes with the exposure time multiplied a preprogramming value (e.g. 5).

In one embodiment, the storing module 106 stores the x-coordinate values, the y-coordinate values, and the z-coordinate values of the camera device 2 sensed by the gravity sensor 3 from the register of the gravity sensor 3 to the storage device 11 in chronological order, as it is shown in the following table:

| Time    | 0.001         | 0.002   | 0.003      | ... |
|---------|---------------|---------|------------|-----|
| (x, y, z) | (0.1, 0.2, 0.3) | (1, 2, 3) | (10, 11, 10) | ... |

In step S103, the calculating module 103 calculates an x-coordinate difference between the minimum x-coordinate value of the obtained x-coordinate values and the maximum x-coordinate value of the obtained x-coordinate values, calculates a y-coordinate difference between the minimum y-coordinate value of the obtained y-coordinate values and the maximum y-coordinate value of the obtained y-coordinate values, calculates a z-coordinate difference between the minimum z-coordinate value of the obtained z-coordinate values and the maximum z-coordinate value of the obtained z-coordinate values, and determines whether the three-dimensional coordinate differences are less than corresponding predefined thresholds, the coordinate difference indicating magnitude of vibration of the camera device 2. If at least one coordinate difference is not less than a corresponding predefined threshold, step S104 is implemented. If the three-dimensional coordinate differences are less than the corresponding predefined thresholds, step S105 is implemented.

In one embodiment, the calculating module 103 determines whether the x-coordinate difference is less than a first threshold, determines whether the y-coordinate difference is less than a second threshold, and determines whether the z-coordinate difference is less than a third threshold. The first threshold, the second threshold and the third threshold are predefined values, for example, the first threshold, the second threshold and the third threshold are the values between 20 and 30. If at least one of the x-coordinate difference, the y-coordinate difference, and the z-coordinate difference is not less than a corresponding predefined threshold, step 104 is implemented. For example, the y-coordinate difference is not less than the second threshold, and the x-coordinate difference is less than the first threshold, and the z-coordinate difference is less than the third threshold. If the x-coordinate difference is less than the first threshold, the y-coordinate difference is less than the second threshold, and the z-coordinate difference is less than the third threshold, step S105 is implemented.

In step S104, the delaying module 104 delays a period of time, and then the flow returns to step S102. In one embodiment, the period of time can be set by the user according to practical experience, for example, the period of time may be set at 100 milliseconds.

In step S105, the controlling module 105 controls the camera device 2 to capture one or more images of the subject object 43, stores the captured images to the storage device 11, and displays the captured images on the display screen 12.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. An image capturing apparatus, comprising:
   a camera device and a gravity sensor;
   a storage device;
   at least one processor; and
   one or more programs stored in the storage device and executable by the at least one processor, the one or more programs comprising:
   an obtaining module that senses accelerations of the camera device using the gravity sensor when an image capturing demand is received, and obtains x-coordinate values, y-coordinate values, and z-coordinate values of the accelerations of the camera device from a space coordinate system in a default time interval;
   a calculating module that obtains a maximum x-coordinate value and a minimum x-coordinate value from the obtained x-coordinate values, calculates an x-coordinate difference between the minimum x-coordinate value and the maximum x-coordinate value, obtains a maximum y-coordinate value and a minimum y-coordinate value from the obtained y-coordinate values, calculates a y-coordinate difference between the minimum y-coordinate value and the maximum y-coordinate value, obtains a maximum z-coordinate value and a minimum z-coordinate value from the obtained z-coordinate values, calculates a z-coordinate difference between the minimum z-coordinate value and the maximum z-coordinate value, and determines whether the three-dimensional coordinate differences are less than corresponding predefined thresholds;
   a delaying module that if at least one coordinate difference is not less than a corresponding predefined threshold, delays a period of time to obtain the x-coordinate values, the y-coordinate values, and the z-coordinate values of the accelerations of the camera device sensed by the gravity sensor in a next default time interval; and a controlling module that if all the three-dimensional coordinate differences are less than the corresponding predefined thresholds, controls the camera device to capture one or more images of a subject object that is placed on a work platform of the image capturing apparatus, and stores the captured images in the storage device.

2. The image capturing apparatus according to claim 1, wherein the gravity sensor stores the x-coordinate values, the y-coordinate values, and the z-coordinate values of the accelerations of the camera device in a register of the gravity sensor.

3. The image capturing apparatus according to claim 2, further comprising:
a storing module that stores the x-coordinate values, the y-coordinate values, and the z-coordinate values of the camera device sensed by the gravity sensor from the register of the gravity sensor to the storage device.

4. The image capturing apparatus according to claim 1, wherein the work platform includes a step motor, a conveyor belt, and a transducer, the step motor controls the conveyor belt to move, and the transducer monitors field of view of the camera device and detects when the subject object that is placed on the conveyor belt enters into a field of view of the camera device.

5. The image capturing apparatus according to claim 4, further comprising a detecting module that sends a control command to the step motor when a control button of the image capturing apparatus is pressed by a user, determines that the image capturing demand is received if the transducer detects the subject object enters into the field of view of the camera device, and determines that no image capturing demand is received if the transducer detects the subject object does not enter into the field of view of the camera device.

6. The image capturing apparatus according to claim 5, wherein the detecting module further sends a control command to the step motor to control the conveyor belt to stop if the transducer detects the subject object enters into the field of view of the camera device.

7. A method for capturing images of an object using an image capturing apparatus, the method comprising:
sensing accelerations of a camera device of the image capturing apparatus using a gravity sensor of the image capturing apparatus when an image capturing demand is received, and obtaining x-coordinate values, y-coordinate values, and z-coordinate values of the accelerations of the camera device from a space coordinates system in a default time interval;
obtaining a maximum x-coordinate value and a minimum x-coordinate value from the obtained x-coordinate values, calculating an x-coordinate difference between the minimum x-coordinate value and the maximum x-coordinate value, obtaining a maximum y-coordinate value and a minimum y-coordinate value from the obtained y-coordinate values, calculating a y-coordinate difference between the minimum y-coordinate value and the maximum y-coordinate value, obtaining a maximum z-coordinate value and a minimum z-coordinate value from the obtained z-coordinate values, calculating a z-coordinate difference between the minimum z-coordinate value and the maximum z-coordinate value, and determining whether the three-dimensional coordinate differences are less than corresponding predefined thresholds;

if at least one coordinate difference is not less than a corresponding predefined threshold, delaying a period of time to obtain the x-coordinate values, the y-coordinate values, and the z-coordinate values of the accelerations of the camera device sensed by the gravity sensor in a next default time interval; and if all the three-dimensional coordinate differences are less than the corresponding predefined thresholds, controlling the camera device to capture one or more images of a subject object that is placed on a work platform of the image capturing apparatus, and storing the captured images in a storage device of the image capturing apparatus.

8. The method according to claim 7, wherein the gravity sensor stores the x-coordinate values, the y-coordinate values, and the z-coordinate values of the accelerations of the camera device in a register of the gravity sensor.

9. The method according to claim 8, further comprising:
storing the x-coordinate values, the y-coordinate values, and the z-coordinate values of the camera device sensed by the gravity sensor from the register of the gravity sensor to the storage device.

10. The method according to claim 7, wherein the work platform includes a step motor, a conveyor belt, and a transducer, the step motor controls the conveyor belt to move, and the transducer monitors field of view of the camera device and detects when the subject object that is placed on the conveyor belt enters into a field of view of the camera device.

11. The method according to claim 10, further comprising:
sending a control command to the step motor when a control button of the image capturing apparatus is pressed by a user, determining that the image capturing demand is received if the transducer detects the subject object enters into the field of view of the camera device, and determining that no image capturing demand is received if the transducer detects the subject object does not enter into the field of view of the camera device.

12. The method according to claim 11, further comprising:
sending a control command to the step motor to control the conveyor belt to stop if the transducer detects the subject object enters into the field of view of the camera device.

13. A non-transitory computer-readable storage medium having stored thereon instructions that, when executed by at least one microprocessor of a image capturing apparatus, causes the image capturing apparatus to perform a method for capturing images of an object, the method comprising:
sensing accelerations of a camera device of the image capturing apparatus using a gravity sensor of the image capturing apparatus when an image capturing demand is received, and obtaining x-coordinate values, y-coordinate values, and z-coordinate values of the accelerations of the camera device from a space coordinates system in a default time interval;
obtaining a maximum x-coordinate value and a minimum x-coordinate value from the obtained x-coordinate values, calculating an x-coordinate difference between the minimum x-coordinate value and the maximum x-coordinate value, obtaining a maximum y-coordinate value and a minimum y-coordinate value from the obtained y-coordinate values, calculating a y-coordinate difference between the minimum y-coordinate value and the maximum y-coordinate value, obtaining a maximum z-coordinate value and a minimum z-coordinate value from the obtained z-coordinate values, calculating a z-coordinate difference between the minimum z-coordinate value and the maximum z-coordinate value, and determining whether the three-dimensional coordinate differences are less than corresponding predefined thresholds;

if at least one coordinate difference is not less than a corresponding predefined threshold, delaying a period of time to obtain the x-coordinate values, the y-coordinate values, and the z-coordinate values of the accelerations of the camera device sensed by the gravity sensor in a next default time interval; and if all the three-dimensional coordinate differences are less than the corresponding predefined thresholds, controlling the camera device to capture one or more images of a subject object that is placed on a work platform of the image capturing apparatus, and storing the captured images in a storage device of the image capturing apparatus.

14. The storage medium according to claim 13, wherein the gravity sensor stores the x-coordinate values, the y-coordinate values, and the z-coordinate values of the accelerations of the camera device in a register of the gravity sensor.

15. The storage medium according to claim 14, wherein the method further comprises:

storing the x-coordinate values, the y-coordinate values, and the z-coordinate values of the camera device sensed by the gravity sensor from the register of the gravity sensor to the storage device.

16. The storage medium according to claim 13, wherein the work platform includes a step motor, a conveyor belt, and a transducer, the step motor controls the conveyor belt to move, and the transducer monitors field of view of the camera device and detects when the subject object that is placed on the conveyor belt enters into a field of view of the camera device.

17. The storage medium according to claim 16, wherein the method further comprises:

sending a control command to the step motor when a control button of the image capturing apparatus is pressed by a user, determining that the image capturing demand is received if the transducer detects the subject object enters into the field of view of the camera device, and determining that no image capturing demand is received if the transducer detects the subject object does not enter into the field of view of the camera device.

18. The medium according to claim 17, wherein the method further comprises:

sending a control command to the step motor to control the conveyor belt to stop if the transducer detects the subject object enters into the field of view of the camera device.

* * * * *